US012711444B2

(12) United States Patent
Ruelke et al.

(10) Patent No.: US 12,711,444 B2
(45) Date of Patent: Aug. 18, 2026

(54) COMMUNICATON SYSTEN AND METHOD FOR INFRASTRUCTURE FAULT DETECTION WITH COORDINATED PUBLIC SAFETY AND ENTERPRISE NOTIFICATION

(71) Applicant: MOTOROLA SOLUTIONS, INC., Chicago, IL (US)

(72) Inventors: Charles R Ruelke, Coral Springs, FL (US); Jimmy Zong, Plantation, FL (US); Woei Chyuan Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 59 days.

(21) Appl. No.: 18/988,977

(22) Filed: Dec. 20, 2024

(65) Prior Publication Data

US 2026/0179019 A1 Jun. 25, 2026

(51) Int. Cl.

| | |
|---|---|
| ***G06Q 10/0635*** | (2023.01) |
| ***G06Q 50/26*** | (2012.01) |
| ***H04L 41/06*** | (2022.01) |
| ***H04L 41/0604*** | (2022.01) |
| ***H04L 67/12*** | (2022.01) |

(52) U.S. Cl.

CPC ....... *G06Q 10/0635* (2013.01); *G06Q 50/265* (2013.01); *H04L 41/06* (2013.01); *H04L 41/0609* (2013.01); *H04L 67/12* (2013.01)

(58) Field of Classification Search

CPC .. G06Q 10/0635; G06Q 50/265; H04L 41/06; H04L 41/0609; H04L 67/12

See application file for complete search history.

(56) References Cited

U.S. PATENT DOCUMENTS

| | | | |
|---|---|---|---|
| 7,873,673 | B2 * | 1/2011 | Cleveland ......... G06F 16/24556 707/804 |
| 8,204,473 | B2 | 6/2012 | Mathis et al. |
| 9,135,808 | B2 * | 9/2015 | Johnson ........... G08B 13/19621 |
| 9,336,675 | B2 | 5/2016 | Miller et al. |
| 10,803,181 | B2 * | 10/2020 | McCoy ............... H04L 63/0407 |
| 11,126,635 | B2 * | 9/2021 | Behzadi .................... G06F 8/10 |
| 11,378,485 | B2 | 7/2022 | Sven et al. |
| 12,024,201 | B2 | 7/2024 | Chakraborty et al. |
| 12,315,321 | B2 * | 5/2025 | Luczak .................... G07C 9/32 |
| 2016/0170818 | A1 * | 6/2016 | Zhu ....................... G06F 11/079 702/185 |
| 2024/0104473 | A1 | 3/2024 | Wilson et al. |

* cited by examiner

*Primary Examiner* — John A Tweel, Jr.

(74) *Attorney, Agent, or Firm* — Barbara R Doutre

(57) ABSTRACT

A communication system and method are provided to generate and receive parsed sensor data bundles (PSDBs), where each parsed sensor data bundle (PSDB) identifies a fault condition associated with each of a plurality of different sensor sources, where those sensor sources are associated with a particular infrastructure of interest (PII). Notifications are generated in response to analytics on the detected fault conditions. The generated notifications include one of an enterprise-only notification, a public safety (PS)-only notification, and a combined PS & enterprise notification. The notification is communicated to a user interface display of a portable radio to provide user selectable access to parsed sensor data associated with the PII. The combined PS and enterprise notification advantageously enables portable enterprise radios to gain controlled access to PS data in addition to the enterprise data associated with a PII.

26 Claims, 6 Drawing Sheets

Figure 4A:
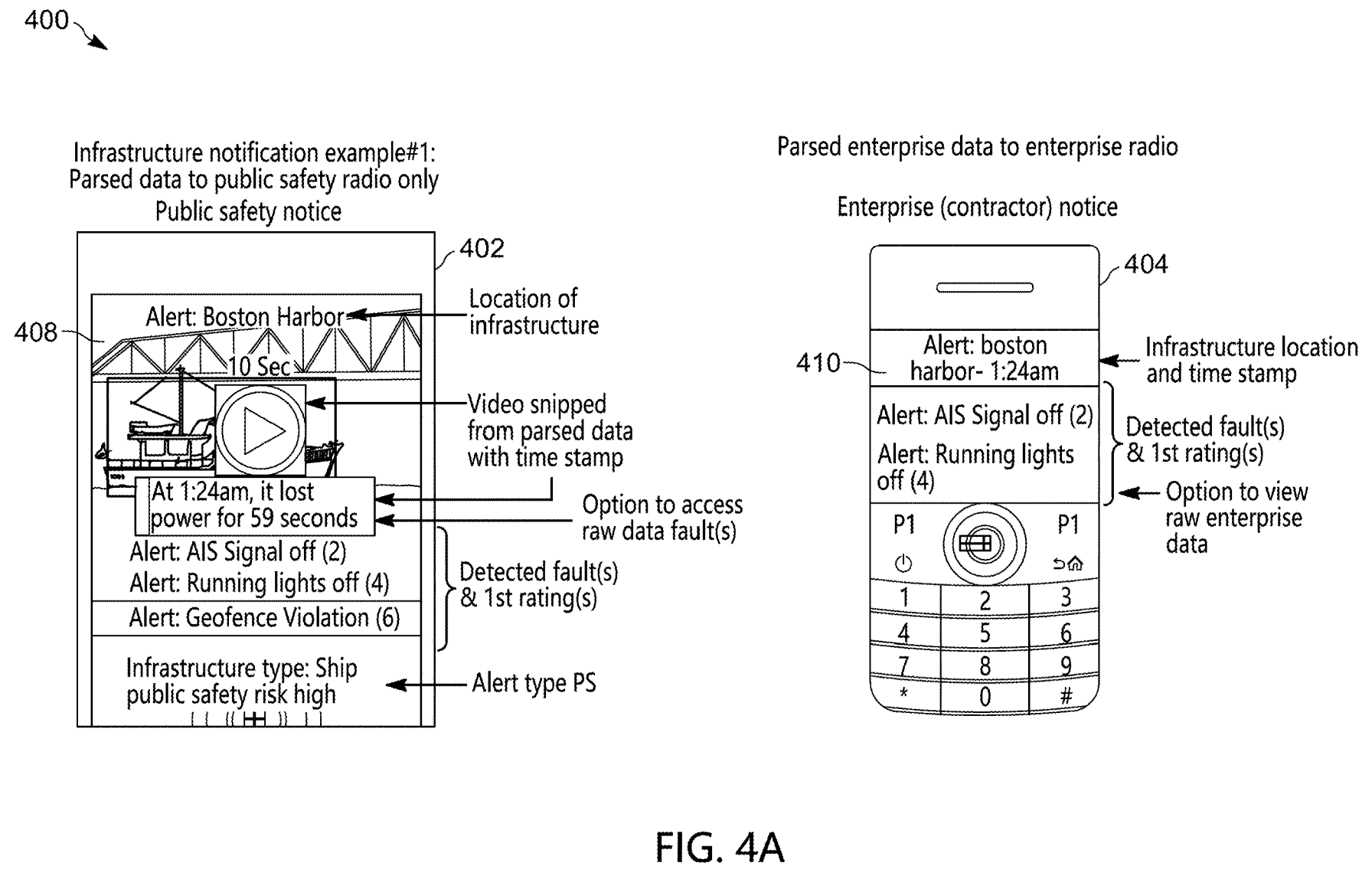

400

Infrastructure notification example#1:
Parsed data to public safety radio only
Public safety notice

402

408

Alert: Boston Harbor

Location of infrastructure

10 Sec

Video snipped from parsed data with time stamp

At 1:24am, it lost power for 59 seconds

Option to access raw data fault(s)

Alert: AIS Signal off (2)
Alert: Running lights off (4)
Alert: Geofence Violation (6)

Detected fault(s) & 1st rating(s)

Infrastructure type: Ship public safety risk high

Alert type PS

Parsed enterprise data to enterprise radio

Enterprise (contractor) notice

404

410

Alert: boston harbor- 1:24am

Infrastructure location and time stamp

Alert: AIS Signal off (2)
Alert: Running lights off (4)

Detected fault(s) & 1st rating(s)

Option to view raw enterprise data

Infrastructure notification example#2: Parsed PS and enterprise data to enterprise &/or public safety radio
Compact display notice enterprise &/or public safety)

COMMUNICATON SYSTEN AND METHOD FOR INFRASTRUCTURE FAULT DETECTION WITH COORDINATED PUBLIC SAFETY AND ENTERPRISE NOTIFICATION

BACKGROUND

Maintaining infrastructure is important to structural safety as well as the safety of nearby individuals, adjacent structures, and/or equipment operating as part of, or within the vicinity of the structure. Infrastructure-related incidents highlight unforeseen accidents that can have dramatic consequences on the safety and integrity of both static infrastructure, such as bridges, highways, buildings, and mobile infrastructure, such as ships, vehicles, and rail systems bridges. There is a need to improve the identification and reporting of faulty infrastructure to appropriate public safety and enterprise recipients.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIGS. 4A, 4B depict example portable radios displaying notifications including parsed sensor data in conjunction with a user selectable option to view raw sensor data based on access permission, in accordance with some embodiments.

Figure 1:
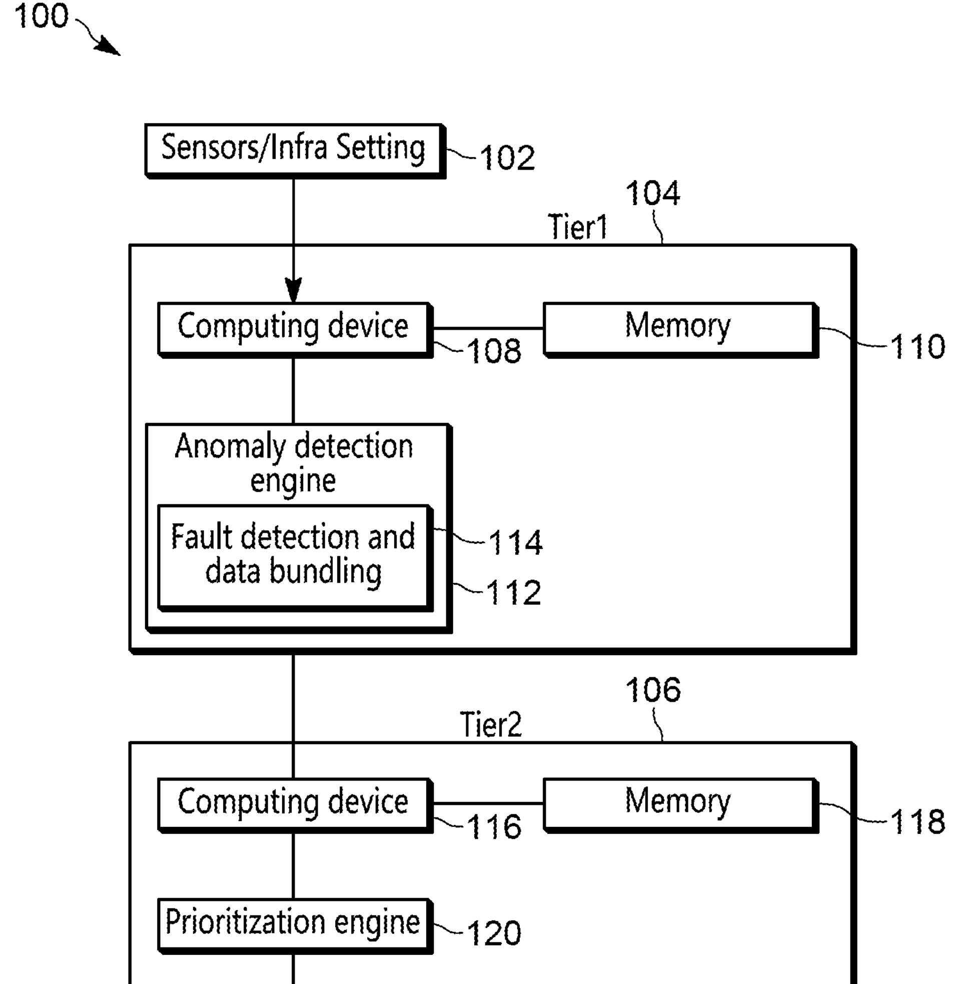
FIG. 1 illustrates a simplified block diagram of a communication system configured to detect infrastructure anomalies and generate fault notifications in response thereto, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Briefly, there is provided herein an improved technical method, device, and system for identifying one or more infrastructure anomalies, providing controlled notifications pertaining to the identified anomalies and controlled access to data associated with the identified anomalies. The method, device and system are configured to generate and receive parsed sensor data bundles (PSDBs), where each parsed sensor data bundle (PSDB) identifies a particularized fault condition associated with each of a plurality of different sensor sources, where those sensor sources are associated with a particular infrastructure of interest (PII). Notifications are generated in response to analytics on the detected fault conditions. The generated notifications include one of an enterprise-only notification, a public safety (PS)-only notification, and a combined PS & enterprise notification. Enterprise denotes non-public safety entities that may operate as private companies or organization, or public-private partnerships, that may be under contract with PS organizations for the support of infrastructure. The notification is communicated to a user interface display of a portable radio to provide user selectable access to parsed sensor data associated with the PII. The combined PS and enterprise notification system advantageously enables portable enterprise radios to gain controlled access to PS data in addition to the enterprise data associated with a PII.

In accordance with one example embodiment, a server comprises an electronic processor operationally coupled to a prioritization engine to provide processor controlled prioritization analytics, the processor controlled prioritization analytics configured to: receive a plurality of parsed sensor data bundles (PSDBs), each parsed sensor data bundle (PSDB) identifying a fault associated with each of a plurality of different sensor sources of a particular infrastructure of interest (PII); generate a first rating for each of identified fault by comparing each identified fault to a predetermined diagnostic profile associated with the PII, the predetermined diagnostic profile including enterprise fault thresholds for the PII and public safety (PS) fault thresholds for the PII; generate a second rating based on a weighted cumulative total of the first-ratings, the first-ratings being algorithmically combined to produce the second rating; compare the second rating to a predetermined cumulative threshold stored in the predetermined diagnostic profile; generate an enterprise-only notification in response to the first rating exceeding the enterprise fault threshold, the enterprise-only notification including parsed sensor data for each identified enterprise fault; generate a PS-only notification in response to the first rating exceeding the PS threshold, the PS-only notification including parsed sensor data for PS fault; and generate a combined PS and enterprise notification in response to the second rating exceeding the predetermined cumulative threshold, the combined PS and enterprise notification including a user selectable option for retrieval of parsed sensor data for each of enterprise and PS faults, the combined PS and enterprise notification.

In another example embodiment, an enterprise portable radio, comprises: a controller having a processor configured to: request, from a server, permission to access both sensor based enterprise fault data and sensor based public safety fault data associated with a particular infrastructure of interest (PII); and receive, from the server and in response to the request, a combined public safety (PS) and enterprise notification, the combined PS and enterprise notification providing access to both the sensor based enterprise fault data and the sensor based public safety fault data when a weighted cumulative total, determined by the server, of all detected enterprise faults and detected PS faults exceeds a predetermined cumulative total associated with the PII, the combined PS and enterprise notification providing user selectable retrieval of parsed sensor data for each identified enterprise fault and each identified PS fault.

In accordance with another example embodiment, a communication system comprises a server configured to: receive a plurality of parsed sensor data bundles (PSDBs) each parsed sensor data bundle (PSDB) identifying a detected fault condition of a particular infrastructure of interest (PII); and generate a first rating for each detected fault condition based on predetermined enterprise fault thresholds and predetermined public safety (PS) fault thresholds associated with the PII; determine a second rating based on a weighted cumulative total of the detected fault conditions which exceed the predetermined enterprise fault thresholds and predetermined PS fault thresholds. The communication system further comprises a portable radio in communication with the server. The portable radio receives one notification, from a plurality of notifications, comprising: an enterprise-only notification in response to the first rating exceeding the predetermined enterprise fault threshold, the enterprise-only notification comprising parsed sensor data for the detected enterprise fault, along with an enterprise user selectable option to view raw enterprise data associated with the detected enterprise fault; a PS-only notification in response to the first rating exceeding the predetermined PS threshold, the PS notification including parsed sensor data for the detected PS fault, along with a user selectable option to view raw PS data associated with the detected PS fault; and a combined PS & enterprise notification in response to the second rating exceeding a predetermined cumulative threshold, the combined PS and enterprise notification comprising user selectable retrieval of the parsed sensor data for each detected enterprise and PS faults.

In accordance with another example embodiment, a communication system, comprises: one or more sensors coupled to one or more infrastructure items; a computing device having a processor and a fault detection and bundling analytics engine providing first-tier processing, the processor configured to: receive real-time raw sensor data inputs from the one or more sensors, the real-time raw sensor data containing information on at least one of the one or more infrastructure items; identify a particular infrastructure item (PII) from the real-time raw sensor data; detect one or more fault conditions for the PII; generate, via the analytics engine, a parsed sensor data bundle (PSDB) to identify each fault condition associated with the PII; communicate the PSDB bundle to a prioritization engine (PE); a second computing device having a second processor and a prioritization engine providing second-tier processing, the second processor and prioritization engine configured to receive the PSDB; generate a first rating for each detected fault condition by comparing each fault to a diagnostic profile, the diagnostic profile including fault thresholds for enterprise and fault thresholds for public safety; determine a second rating based on a weighted cumulative total for all detected enterprise faults and all detected PS faults for the PII; compare the second rating to a predetermined cumulative threshold; and generate an enterprise-only notification in response to the first rating exceeding the enterprise fault threshold, the enterprise-only notification including parsed sensor data for the detected enterprise fault along with enterprise user selectable option to view raw enterprise data associated with the enterprise fault; generate a PS-only notification in response to the first rating exceeding PS threshold the PS-only notification including parsed sensor data for PS fault along with a user selectable option to view raw PS data associated with PS fault; and generate a combined PS & enterprise notification in response to a weighted cumulative total of all detected faults reported in the received PSDB(s) which exceed the PS and enterprise thresholds for the identified particular PII, the combined PS and enterprise notification including selectable retrieval of parsed sensor data for each identified enterprise fault and each identified PS fault along with a user selectable option to view raw sensor data associated with each identified PS and enterprise fault.

In accordance with another example embodiment: a method, comprises: receiving, at a computing device, at least one of a plurality of real-time raw sensor data inputs from at least one sensor source of a plurality of sensor sources, the real-time raw sensor data containing information on at least one or more infrastructure items; identifying a particular infrastructure item (PII) from the real-time raw sensor data; detecting one or more fault conditions for the PII; generating a parsed sensor data bundle (PSDB) identifying each fault condition associated with the PII; communicating the PSDB bundle to a prioritization engine (PE); generating a first rating for each detected fault by comparing each detected fault to an associated diagnostic profile, the diagnostic profile including fault thresholds for enterprise and fault thresholds for public safety (PS); determining a second rating based on a weighted cumulative total of all detected faults of enterprise and PS for the PII; comparing the second rating to a predetermined cumulative threshold stored in the diagnostic profile; generating an enterprise-only notification in response to the first rating exceeding the enterprise fault threshold, the notification including parsed sensor data for the detected enterprise fault along with enterprise user selectable option to view the real-time raw sensor data associated with the enterprise fault; generating a PS-only notification in response to the first rating exceeding PS threshold, the notification including parsed sensor data for the detected PS fault along with a user selectable option to view the real-time raw sensor data associated with the identified PS fault; generating a combined PS and enterprise notification in response to the second rating exceeding predetermined cumulative threshold, the combined notification including user selectable retrieval of the parsed sensor data for each of enterprise and PS faults; and generating a further user selectable option to view the real-time raw sensor data associated with each identified PS fault and enterprise fault.

In accordance with another example embodiment a method comprises: receiving, at a computing device, at least one of a plurality of real-time raw sensor data inputs from at least one sensor source of a plurality of sensor sources, the real-time raw sensor data containing information on at least one or more infrastructure items; identifying a particular infrastructure item (PII) from the real-time raw sensor data; detecting one or more fault conditions for the PII; generating a parsed sensor data bundle (PSDB) identifying each fault condition associated with the PII; communicating the PSDB bundle to a prioritization engine (PE); generating a first rating for each detected fault by comparing each detected fault to an associated diagnostic profile, the diagnostic profile including fault thresholds for enterprise and fault thresholds for public safety (PS); determining a second rating based on a weighted cumulative total of all detected faults of enterprise and PS for the PII; comparing the second rating to a predetermined cumulative threshold stored in the diagnostic profile; generating an enterprise-only notification in response to the first rating exceeding the enterprise fault threshold, the notification including parsed sensor data for the detected enterprise fault along with enterprise user selectable option to view the real-time raw sensor data associated with the enterprise fault; generating a PS-only notification in response to the first rating exceeding PS threshold, the notification including parsed sensor data for the detected PS fault along with a user selectable option to view the real-time raw sensor data associated with the identified PS fault; generating a combined PS and enterprise notification in response to the second rating exceeding predetermined cumulative threshold, the combined notification including user selectable retrieval of the parsed sensor data for each of enterprise and PS faults; and generating a further user selectable option to view the real-time raw sensor data associated with each identified PS fault and enterprise fault.

Each of the above-mentioned embodiments will be discussed in more detail below, starting with example system and device architectures of the system in which the embodiments may be practiced, followed by an illustration of processing blocks for achieving an improved technical method, device, and system for infrastructure fault detection with controlled public safety and enterprise notification and data access.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

FIG. 1 illustrates a simplified block diagram of a communication system 100 formed and operating in accordance with some embodiments. Communication system 100 comprises at least one of a plurality of sensor sources 102 associated with an infrastructure setting, where infrastructure setting refers to one or more infrastructure items are monitored in tandem by sensor sources 102 either by preset targeting of an infrastructure item(s) or by incidental/secondary capture of a second infrastructure item by the same sensor sources. For example, "infrastructure setting" may include a bridge (target infrastructure) at a particular time, which may change in time to include the bridge and transient passage of a ship or train (secondary infrastructure) being monitored simultaneously at a different time by the same sensor source 102. As an alternative example, an infrastructure setting may include a building entrance (targeted infrastructure) and also include monitoring of bus activity (secondary infrastructure) by the same sensor source 102. The plurality of sensor sources 102 generate real-time raw sensor data which is processed through a first-tier processing stage 104 (also referred to as first-tier processing) for identifying and distinguishing between particular infrastructure of interest (PII) and detecting one or more fault conditions associated with the identified PII. The first-tier processing stage 104 generates a parsed sensor data bundle (PSDB) which identifies any detected fault condition(s) for the particular PII.

The PSDB, including the fault condition associated with the PII, is further processed through a second-tier processing stage 106 (also referred to as second-tier processing) for determining prioritization rating(s). Notifications are determined, based on the prioritization ratings, for transmission to one or more PS and/or enterprise portable radios each having a user interface display.

The first-tier processing stage 104 comprises a first computing device 108, a first-tier memory 110, and an anomaly detection engine 112 including a fault identification data bundling engine 114. The first computing device 108 is operatively coupled to the first-tier memory 110, and the anomaly detection engine bundling engine 112. The sensor sources 102 comprise at least one video camera for capturing real-time video and at least one other non-video sensor.

The second-tier processing stage 106 comprises a second computing device 116, a second-tier memory 118, and a prioritization engine 120. The second computing device 116 is operatively coupled to the second-tier memory 118, and the prioritization engine 120.

In accordance with some embodiments, the sensor sources 102 generate real-time raw sensor data associated with one or more particular infrastructure items (PII) of the infrastructure setting. The real-time raw sensor data associated with each of the PIIs is communicated, as individual data streams from each sensor, for input to the first-tier processing stage 104. Communication of the raw sensor data from sensor sources 102 to processing stage 104 may be accomplished by any means as is known in the art. This may include, but is not limited to, direct hardware connectivity between the sensor and processing stage, Internet Protocol (IP) packet-data Transmission Control Protocol (TCP) governed communication networks between the sensor 102 and first-tier processing stage 104, near-field wireless connectivity (i.e.: WiFi, Bluetooth, etc) and/or wide-area cellular data communication networks (i.e.: LTE, CDMA, GSM, 5G, etc) interconnecting the sensors and the processing center, and/or point-to-point microwave communications, or any combination thereof.

The real-time raw data from each sensor stream is processed at first computing device 108 to identify each particularized PII and to detect one or more fault conditions that may be associated with each PII. Fault conditions for various PIIs may be characterized and stored in first memory 110 and retrieved by the anomaly detection engine 112. The first memory 110 stores both enterprise fault conditions and PS fault conditions for a given PII type.

While all of the real-time raw sensor data may be stored in the first memory 110, access to such data is controlled based on categorizing of the raw sensor data as either raw sensor data accessible by PS and associated with a PS fault and/or raw sensor data accessible by enterprise and associated with an enterprise fault.

Once a fault condition for a PII has been detected at anomaly detection engine 112, the raw sensor data that contains the particular detected fault condition is then parsed and forwarded to data bundling engine 114, to generate a parsed sensor data bundle (PSDB). In this context, the term "parsed" means to extract from the raw sensor data that portion of sensor data that indicates the detected fault. The PSDB may include, but is not limited to, the parsed sensor data indicating the detected fault, the detected fault condition/category that represents the fault, and the particular PII that was identified as exhibiting the fault condition. Data included in the PSDB may also include the sensor type that generated the raw data which is contained in the PSDB, time stamp information regarding when the data fault was detected, and/or relevant location information related to both the sensor location and/or the predicted location of the PII experiencing the fault condition. Each individual detected fault will result in an associated PSDB being generated for that fault; therefore, each PSDB generated from each particular sensor raw data stream will be appropriately parsed to include one fault condition for each identified PII.

First-tier processing 104 can generate multiple PSDBs from a single sensor source for the same fault condition for a particular PII. This is exemplified in video detection of flames from a first-floor window for a particular building, followed later in time by video detection of flames from the second-floor (or different location of the first-floor) of same building. In this example, one PSDB is generated for the first instance of flame detection from video, and a second PSDB is generated for the second instance of flame detection from the same video source, but for a different location and time. Alternatively, there can be different detected fault conditions from different sensor sources for a particular identified PII (i.e.: smoke detector sensor alert and video detection of flames from a first-floor window for a particular building will each result in a PSDBs for that building, one PSDB for each particular sensor). And finally, there may be fault conditions detected for different PIIs from a single sensor source, such as a video detection of flames from different PII (i.e.: different buildings) at the same time but being generated from a single video sensor source that incidentally captures images of multiple buildings that are proximate to the video monitoring sensor.

The PSDB generated by data bundling engine 112 is communicated as an input to the second-tier processing stage 106 at second computing device 116. As part of the processing process of the PSDB, second computing device 106 may store the PSDB in memory device 110 118 along with any associate processing outcomes affiliated with second-tier processing and communications. The second computing device 116 also triggers the prioritization engine 120 to apply prioritization analytics to the PSDB.

Based on the prioritization analytics applied to the PSDB, the prioritization engine 120 generates a first rating for each detected fault by comparing each fault to a predetermined diagnostic profile (PDP), the predetermined diagnostic profile including enterprise fault thresholds for enterprise faults and PS fault thresholds for public safety faults. The PS fault threshold(s) and the enterprise fault threshold(s) may be different. Information contained in PDP(s) may include itemization of PS thresholds and enterprise thresholds for all possible fault conditions for particular PIIs, the possible fault conditions being tailored to the particular PII being monitored (i.e.: possible fault conditions for ships may be different from faults for buildings, and fault conditions/thresholds for a multi-story apartments(s) may be different from single story private residences or offices), and diagnostic threshold(s) being adapted to the function of the PII (i.e.: the thresholds for visible flames on a private luxury yacht may be different from visible flames on a commercial oil tanker). The relevant thresholds in the PDP are stored in the second memory 118, and are delineated prior to second-tier processing of the fault prioritization.

The prioritization engine 120 determines a second rating based on a weighted cumulative total of all detected faults reported in the received PSDB(s) which exceed the PS and enterprise thresholds for the identified particular PII. The second rating represents a compilation of all defects for a PII, each defect having a first rating, the first-ratings being algorithmically combined to produce the second rating. The prioritization engine 120 compares the second rating to a predetermined cumulative threshold.

The prioritization engine 120 generates one or more notifications 122 (enterprise notification (i.e. enterprise-only notification), PS notification (i.e. PS-only notification), combined enterprise & PS notification) based on the ratings. The notifications including, relevant ratings, are sent to, and received by, a portable radio 126 having a user interface (UI) display. For example, a PS-only notification will be sent to, and received by, a PS portable radio, and an enterprise-only notification will be sent, and received by, an enterprise portable radio, and the combined PS and enterprise notification will be sent to, and received by, either or both of a PS radio or an enterprise radio. Notifications may be automatically sent from the communication system to the portable radios, or sent in response to a request from the portable radios. The enterprise radio particularly benefits from the combined PS and enterprise notification which provides controlled retrievable access to otherwise inaccessible PS data, in addition to the enterprise data.

For example, the enterprise notification is generated, by the prioritization engine 120, in response to the first rating exceeding an enterprise threshold, the notification including enterprise appropriate parsed sensor data, effected PII, and/or fault type/classification for the enterprise fault. The notification may further include an enterprise user selectable option to view the raw enterprise data associated with the enterprise fault. The term enterprise fault refers to one or more first ratings for a detected fault of a particular PII that exceeds the enterprise fault threshold(s).

As another example, the PS notification is generated, by the prioritization engine 120, in response to the first rating exceeding the PS fault threshold, the notification including PS appropriate parsed sensor data for the PS fault, effected PII, and/or fault type/classification along with a user selectable option to view the raw PS data associated with the PS fault. The term PS fault refers to one or more first ratings for a detected fault of a particular PII that exceeds the PS fault threshold(s).

As another example, the combined PS and enterprise notification is generated, by the prioritization engine 120, in response to the second rating exceeding a predetermined cumulative threshold, the combined notification including selectable retrieval of parsed sensor data for each of the enterprise and PS faults. A further user selectable option may be generated for the combined PS and enterprise notification by the prioritization engine 120, whereby appropriate access is granted to PS radio(s) to view raw sensor data associated with enterprise, and/or appropriate access is granted to enterprise radio(s) to view raw sensor data associated with PS.

For a combined notification sent to and received by a PS portable radio, the PS portable is provided with selectable access, via a user interface (UI) display, to retrieve all of the parsed sensor data for the PS fault(s), and all of the raw PS data associated with the PS fault(s) as well as all enterprise parsed sensor data for each of the enterprise faults and all of the raw sensor data associated with each identified enterprise fault. In other words the PS radio is granted access to all data indicative of a fault associated with a particular PII.

For a combined notification being sent to, and received by, an enterprise portable radio, the enterprise radio is provided with complete access to all the parsed enterprise sensor data for each enterprise fault and may further be provided access to all of the raw sensor data associated with each identified enterprise fault. And, the combined notification generated for the enterprise radio is further configured, by the prioritization engine, to provide complete access to the parsed sensor data for the PS fault. The combined notification for the enterprise radio may further be configured to provide access to the raw PS data associated with the PS fault. In other embodiments, the combined notification generated for the enterprise radio may be configured by the prioritization engine 120 to provide partial access to the PS data (i.e.: parsed data and/or raw data) as appropriate for facilitating the Enterprise function in supporting PS operations. In other words, the Enterprise access to PS data may be limited so as to exclude access to PS data that is deemed unnecessary or unrelated to enabling the Enterprise operations.

In some embodiments, the combined notification generated for an enterprise radio may be configured by the prioritization engine 120 to provide complete access to the parsed PS sensor data but not the PS raw sensor data.

The prioritization engine 120 may further configure the notification to limit or prevent access to private information in order to protect some PS interests, for example by limiting access of the enterprise radio to private PS information while allowing access to non-private information. For example, enabling access to public information within the parsed sensor data for the PS fault and the raw PS data associated with the PS fault while preventing access to infrastructure data which contains private or confidential information as determined by law or public policy, such as victim or suspect identification, victim or suspect injuries, tracking of an individual and/or other PS data which may be considered private/confidential, but which was captured within a portion of the parsed PS data and/or raw PS data.

While the communication system 100 is shown as having first and second processors and first and second memories, it is appreciated that the processing may take place via partitioned processor functions and segmented memory allocations of a single server. For example a server may provide localized and/or distributed, cloud-based and/or embedded processing.

Figure 2:
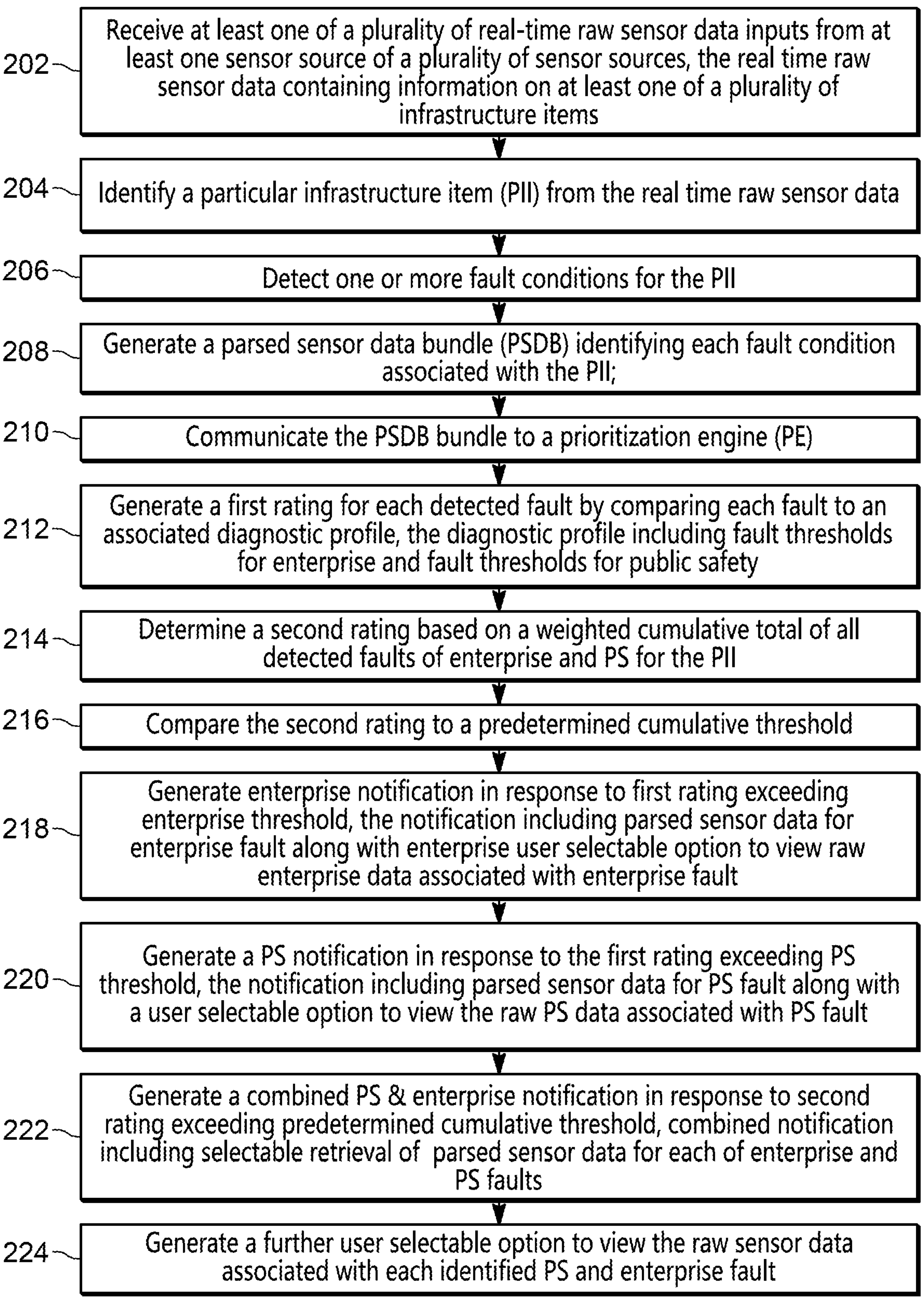
FIG. 2 illustrates a flowchart of a method for generating enterprise, PS, and combined enterprise & PS notifications which provide controlled access to sensor data associated with an infrastructure, in accordance with some embodiments.

FIG. 2 illustrates a flowchart of a method 200 for generating enterprise, PS, and combined enterprise & PS notifications which provide controlled access to sensor data associated with a particular infrastructure of interest (PII), in accordance with some embodiments.

The method 200 begins at 202 by receiving, at a controller of a computing device of at least one of a plurality of real-time raw sensor data inputs from at least one sensor of a plurality of sensor sources, the real-time raw sensor data containing information on at least one of a plurality of infrastructure items with which the sensor is associated. Each infrastructure item within a plurality of Infrastructure that may be monitored by a given sensor source is partitioned into specific PIIs so as to distinguish between individual infrastructure (i.e.: different buildings, bridges, ships buses, are distinguished by their unique PII).

The real-time raw sensor data may be generated by, for example, real-time video monitor, real-time GPS tracking, real-time transponder transmissions as part of an Automatic Identification System (AIS), real-time seismic monitor, and/or weather monitor to name a few. The infrastructure items may include one or both of physical systems & facilities infrastructure and transportation infrastructure. Systems & facilities infrastructure generally refers to permanent structures which serve a community such as residential and commercial buildings, power generation facilities, governance facilities, bridges, building, roads, railroad tracks, seaports, and utilities to name a few. Transportation infrastructure generally refers non-static structures moving through those systems and facilities, such as a vehicle, ship, railcar, and aircraft to name a few.

The method proceeds to 204 with identifying, by the controller of the computing device, a particular infrastructure item (PII) from the real-time raw sensor data. For example, the raw sensor data may be video generated from a video device monitoring a bridge expanse traversing a navigable water-way such as a river. While monitoring the bridge, it is anticipated that the video will naturally capture ships and various watercraft traversing underneath the bridge. The bridge itself is designated as Systems & facilities infrastructure being distinguishable as a specific PII item, the bridge PII having its own associated predetermined diagnostic profile (PDP). The traversing water traffic under the bridge is designated as transportation infrastructure, where each ship and/or watercraft is distinguishable as a specific PII item, the watercraft each having an associated PDP appropriate for the watercraft function and operation. At step 204, the computing device distinguishes between individual PII items within a particular sensor's raw data, both transient and fixed Infrastructure. The raw sensor data is stored in memory, along with the designated PII item(s) represented in the raw data. Once the PII(s) within the raw sensor data has been identified, the appropriate PDP for each PII is accessed and the method then proceeds to 206.

At step 206, the raw sensor data is compared to the predetermined diagnostic profile (PDP) that includes particularized thresholds appropriate to a sensor data type (i.e: video fault indications, transponder transmission detection/identification, seismic vibration excursion outside of tolerances, and the like). Should a PS or enterprise fault threshold be exceeded, a possible fault condition is said to exist in the identified PII that is indicative of the existence of a PII fault condition. This real-time comparison of raw sensor data to the PDP threshold is continuous, and may result in the detection of one or more fault conditions occurring proximate to each other in time for one or more PIIs. The fault conditions for PII(s) may be stored in memory for future retrieval and further processing in subsequent steps.

The method proceeds to 208, where the controller's data bundler, generates a parsed sensor data bundle (PSDB) identifying each fault condition associated with the PII. The PSDB is extracted from raw sensor data that represents the detected occurrence of a possible PII fault condition. A PSDB is generated for each sensor source transmitting raw data that exceeds the sensor specific diagnostic profile threshold. For example, if raw video data visually indicates the presence of flames on a ship, a finite time-frame of video (i.e.: 20 seconds) is extracted from the raw video data that includes the possible fire condition and the parsed (i.e.: extracted) video is included in a PSDB. If bundler step 204 also receives raw seismic data that exceeds tolerance for normal conditions, such as vibration excursions indicative of a possible explosion or collision, a different PSDB is generated encompassing a portion of the raw seismic data that exceeds the fault threshold, and may also include appropriate time stamp and sensor location information so that fixed position Systems & facilities infrastructure PII proximate to the seismic sensor may be identified. The PSDB bundle(s) are communicated to a prioritization engine (PE) at 210.

The prioritization engine includes generating a first rating for each detected fault at step 212, where each detected fault is represented by the received PSDB. The first rating in generated by correlating each detected fault to a context-based classification (CBC) type as documented in the PDP and associated with the PII. For example, a video image indicating the presence of flames for a fixed structure item (i.e.: bridge, building, business facility, etc.) may have the same defect fault threshold regardless of the PII that is being imaged; however, the detection of flames for a PII identified as a single-family private residence may have a CBC type as a "localized fault" condition, while the detection of flames for a PII identified as a multi-story apartment building may be CBC type as a "extended fault" condition. In addition, detection of flames for a PII identified as a chemical processing facility may be CBC type as "critical fault" condition. In other words, the CBC type for a fault is predetermined based on the impact of a particular fault to proximate infrastructure in regard to public infrastructure operations. A context-based classification (CBC) is assigned to every fault for a given PII, whereby a different first-rating is a'priori set in the PDP based on the CBC type. The CBC based first-rating is included in the PDP for a particular PII and may be scaled differently for PS detected faults, and enterprise detected faults. Accordingly, PDP contains both PS and/or enterprise fault thresholds and CBC(s) for each fault appropriate for generating a first-rating. In addition, while the fault threshold may be agnostic to the PII (i.e.: the threshold for fire detection is agnostic if detected in a chemical plant or a private residence for PS), the CBC used to generate the first rating is contextualized for appropriate PS and/or enterprise alert responses. After determining a first rating based on defect specific CBC, the prioritization engine proceeds to 214.

The method proceeds to 214 with determining a second rating based on a weighted cumulative total of all detected faults of enterprise and public safety for the specific PII. The second rating is representing a compilation of all defects for a PII, each defect having a first rating, the first-ratings being algorithmically combined to produce the second rating, the second rating being used to determine tandem messaging types for both PS and enterprise.

The method proceeds to 216 by comparing the second rating to a predetermined cumulative threshold. The cumulative threshold affiliated with the PII second rating is preset in the PDP.

The method proceeds to 218 with generating an enterprise notification, by the controller, in response to the first rating exceeding an enterprise threshold, the notification including parsed sensor data capturing the enterprise fault occurrence, and also including an enterprise user selectable option to view the raw enterprise data associated with the enterprise fault.

The method proceeds to 220 with generating a PS notification, by the controller, in response to the first rating exceeding a PS threshold, the notification including parsed sensor data for the PS fault that represents the fault condition, along with a PS user selectable option to view the raw PS data associated with the PS fault.

The method proceeds to 222 with generating a combined PS and enterprise notification, by the controller, in response to the second rating exceeding a predetermined cumulative threshold, the combined notification including selectable retrieval of parsed sensor data for each of the enterprise and PS faults. The method proceeds to 224 with generating a further user selectable option to view the raw sensor data associated with each identified PS and enterprise fault.

The notifications of method 200 are coordinated for communication to a user interface of a portable radio. For example, the enterprise notification is communicated to a user interface of an enterprise portable radio, the PS notification is communicated to a user interface of a PS portable radio, and the combined PS notification and enterprise notification are communicated to a user interface of a PS portable radio and/or a user interface of an enterprise portable radio.

The combined notification may, as previously described be configured to prevent access to some of the PS information within the parsed PS sensor data and raw PS data where such data might include private information or otherwise be restricted in accordance of public policy guidelines.

Figure 3A:
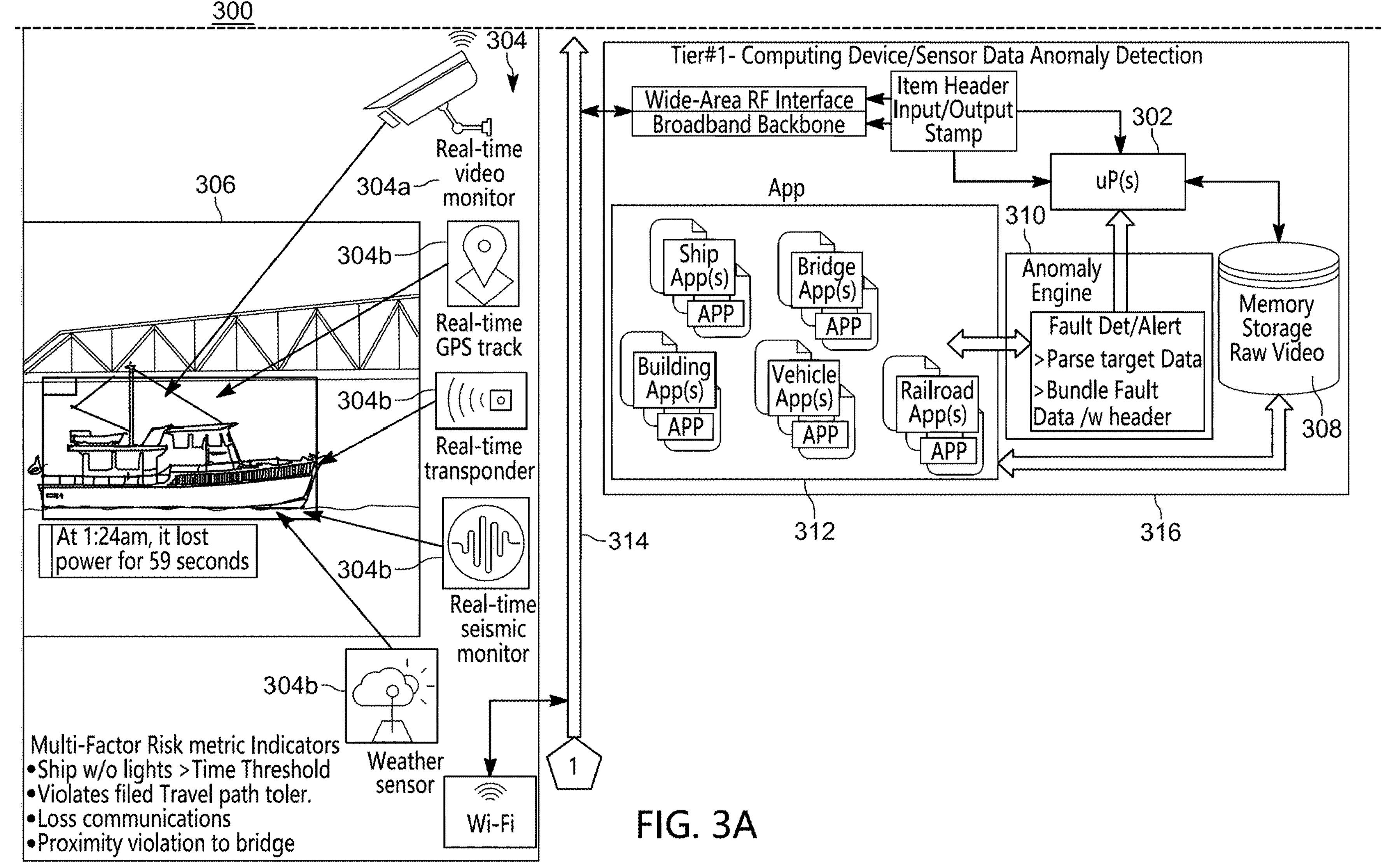
FIGS. 3A, 3B illustrate an example of a more detailed system diagram of the communication system of FIG. 1 operating in accordance with some embodiments.
Figure 3B:
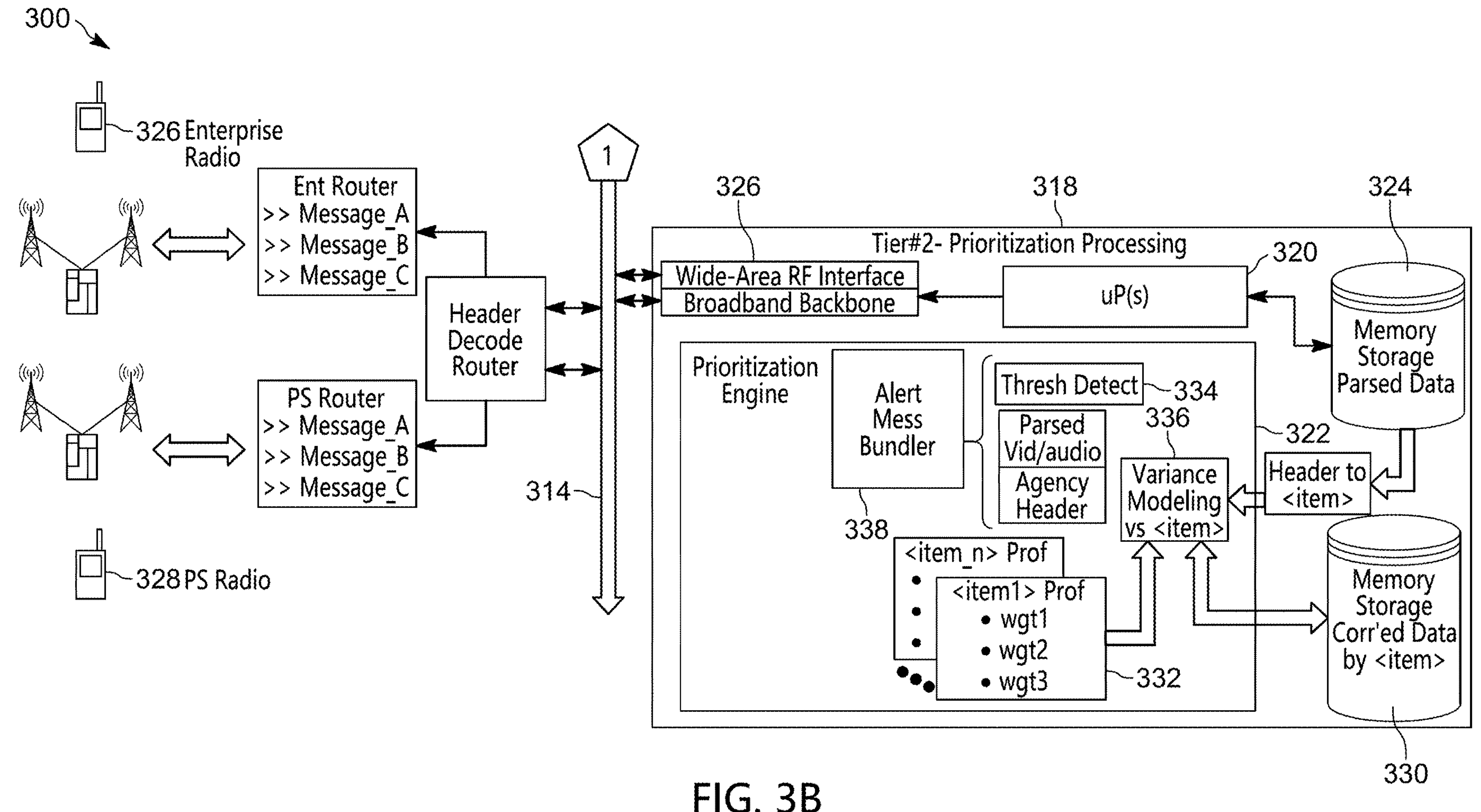

FIGS. 3A, 3B illustrate an example of a more detailed system diagram of the communication system of FIG. 1 as realized in a communication system 300 operating in accordance with some embodiments. The communication system 300 includes a processor 302 which receives raw sensor data from one or more sensor sources 304 that generate real-time raw sensor data affiliated with at least one PII within an infrastructure context 306. The raw sensor data may be stored in a memory 308. Analytics are applied by processor controlled, anomaly detection engine 310 to identify one or more particular infrastructures of interest (PIIs). For example, the identification of a PII may be based on one or more infrastructure applications 312, also referred to as infra-apps 312, downloaded from memory 308. The infra-apps 312 are customized to process raw sensor data that is pre-determined to include known PII in the data that represents operating conditions of a particular PII(s). Each particular application routine in infra-apps 312 include PII identification information specific to its PII target and when processing the raw sensor data is tasked with identifying potential associated fault conditions for each PII as defined in the appropriate predetermined diagnostic profile (PDP). For example, the infra-apps 312 may include one or more application "families" such as: ship app(s), bridge app(s), building app(s), vehicle app(s), and/or railroad app(s), to name a few. Each application family in infra-apps 312 is customized to process sensor data relative to a class of PII in regard to its PDP (i.e.: ships, building, bridges, etc), and each individual application within a family is tailored to process raw data for a particular sensor type (i.e. video, acoustic, seismic, transponder, etc.). Accordingly, an application as described herein may be a standalone application individually processing sensor data, or subroutines embedded within a single processing function for processing data from multiple sensor sources as related to a particular class of PIIs.

For example, for infra-apps 312 there may be multiple Ship App(s), but within the family of Ship App(s) there is at least one application for processing ship imaging from land-based real-time video sensor source(s). A video centric ship app may include processing instructions for image recognition that distinguish between individual ships, and for distinguishing between ocean going ships and other watercraft based on relative size. In addition, Ship Apps may further process singulated ship images extracted from raw video data so as to facilitate detection of visual indicators of possible defects as defined in the predetermined diagnostic profile (PDP) for a ship. Another application in a Ship App(s) family may facilitate processing transponder signaling to detect the presence (or absence) of ship transponder beacon transmissions that communicates ship identification and positioning information. The transponder centric Ship App(s) may detect the absence of a transponder signal (i.e.: example of a PDP fault type) or alternatively detect transponder location information that indicates a ship is too close to known shore-based infrastructure locations, such as a bridge pylon (i.e.: example of a different PDP fault type). Once a possible defect for a ship has been detected relative to a PDP, a trigger signal with appropriate defect type and relevant sensor data generated by the Anomaly Engine 310.

In another example, for infra-apps 312 there are multiple Building App(s), but within the family of Building App(s) there is at least one application for raw video data to distinguish between interior and exterior building image. Additionally, for exterior building video, there are processing instructions for distinguishing between individual building within the video data. In addition, Building App(s) may further include application instructions to process singulated building images extracted from raw video data so as to facilitate detection of visual indicators of possible defects (i.e.: visible flames) as defined in the predetermined diagnostic profile (PDP) for a building. Another application in the family of Building App(s) may facilitate processing of smoke and/or heat sensor data such that if smoke or thermal signatures exceed a predetermined threshold (as set in the building PDP) a building fault detect signal is triggered. Once a possible defect for a building has been detected by a particular application relative to a PDP, a trigger signal with appropriate defect type and relevant sensor data generated by the Anomaly Engine 310.

Accordingly, as outlined in the preceding description, at least one of the infra-apps 312 is associated with one or more of the sensor sources 304 that may be monitoring one or more PII(s) contained in the infrastructure context 306. In this example, one of the ship apps is communicatively associated with one or more sensor sources 304 that are generating raw sensor data capturing the operation of a PII identified as a ship. The sensor sources 304 include at least one real-time video monitor 304*a*, and at least one other non-video sensor 304*b*, associated with the ship. For example, the non-video sensor sources 304*b* associated with the ship infrastructure may include a real-time GPS tracker, real-time transponder, real-time seismic monitor, and/or weather sensor, to name a few.

In accordance with this example embodiment, the processor 302 is configured to receive raw sensor data associated with real-time video and at least one or more real-time raw sensor data inputs from at least one non-video sensor 304*b*. The real-time raw sensor data contains information on at least one infrastructure item PII, but may include multiple infrastructure items, wherein each infrastructure item in a context 306 is identified as a particular PII. For this example, the real-time raw sensor data for infrastructure 306 may include information pertaining to a ship PII and/or a bridge PII.

Based on the real-time raw sensor data, the anomaly engine 310 identifies the particular infrastructure item (PII) (such as at 204 of method 200) as indicated by the appropriate application in infra app 312 and detects one or more fault conditions of the identified PII by applying the designated PDP for that family of applications appropriate for processing sensor sources 304 (such as at 206 of method 200).

For example, the processor 302 may retrieve predetermined diagnostic profiles (PDP) from the memory 308, and forward the retrieved PDPs to anomaly engine 310 for processing of the raw sensor data, for example via infra-apps 312. The PDPs stored in the memory 308 are specific to various classes of PIIs (e.g. ship and bridge), with each PDP containing one or more predetermined thresholds to indicate fault conditions as appropriate for the sensor data being processed. The PII profiles may include fault conditions such as normal/abnormal operational parameters and/or operational states associated with the various PIIs. For example, normal operation for a given PII such as a ship or entrance to a building, may be to have video indication of lights being on, while a possible abnormal ship or building operation is to have lights off. In addition, normal operation acceptable for a ship traversing a harbor may be to have active transponder transmissions, while a fault condition may be the absence of a transponder signal. And once the ship transponder signal is processed, the reported location signal indicates ship operations inside a designated maritime navigational geofence, while GPS positioning outside of a geofence may indicate a fault condition, particularly if operating in a region proximate with the bridge infrastructure item. Additional normal/abnormal operating conditions may include visual indications of the absence/presence of flames on the ship; ship distance to other PIIs being acceptable/too close; watercraft velocity being within/exceeding posted speed limits, to name a few. The anomaly engine 310 detects (or not) one or more fault conditions, based on the retrieved PDPs associated with a singular PII. The detection of a fault is determined by comparing the raw sensor data for the singular PII to the fault threshold delineated in the PDPs (e.g. detected faults for ship): lights out on ship, transponder off, inside geofence, etc).

The processor controlled, anomaly engine 310 detects one or more faults for a PII. The anomaly engine 310 then applies data bundling to generate a parsed sensor data bundle (PSDB), which at a minimum includes the identified PII and detected fault condition associated with the PII (such as 208 method). The PSDB may be generated, for example, by parsing the raw sensor data spanning a predetermined time period which contains the detected fault condition for the PII, and packetizing the parsed sensor data that triggered the fault alert, along with an associated fault classification and identification of the PII exhibiting the fault (i.e.: building address/name, bridge designation or identifiable landmark proximate to the PII having the fault). In addition to PII identification and fault condition, the parsed sensor data may further include sensor source (type of sensor) and time stamps representing the fault condition time period.

Examples of identified fault conditions associated with a PII might include, for example, ship without lights exceeding a predetermined time period threshold, a GPS path tracking going beyond predetermined boundaries, loss of communication exceeding a communication time threshold, and proximity of one PII to another PII (ship/first PII too close to bridge/second PII) to name a few.

The various processing to generate the PSDB with identified PII and detected fault condition are intended to detect the presence of a possible fault without specificity as to the fault's severity or certainty, and may be considered first-tier processing 316. The PSDB bundle is then processed through a second-tier processing 318 to determine ratings based on the detected fault conditions exceeding enterprise fault thresholds and/or PS fault thresholds. The PSDB may be communicated from the first-tier processing 316 to the second-tier processing 318 over a communication interface 314, such as supported by a wireless broadband and/or narrowband network, or IP packet-data Transmission Control Protocol (TCP) governed communication networks data network, or combination thereof, to a prioritization engine (PE) 322 (210 at method 200), shown in FIG. 3B.

The PSDB bundle(s) including PII identification and detected fault condition are forwarded for second-tier prioritization processing 318 comprising a second processor 320 which controls a prioritization engine 322, and a memory 324.

Briefly, the processor controlled prioritization engine 322 receives the PSDB being communicated through interface 314 to second processor 320 which extracts from the PSDB the particularities identifying the PII, the fault classification, and the parsed sensor data containing the fault indication. From the PII, processor retrieves the appropriate PDP for the PII, and communicates the PDP, fault classification, and sensor data from the PSDB to Prioritization Engine 322. The PE 322 is tasked with generating ratings with which to establish PSDB access for remote portable radios, enterprise radio 326 and/or PS radio 328. The ratings may be generated based on predetermined diagnostic profiles (PDP) stored in memory 330.

The prioritization engine 322 generates a first rating for each detected fault condition (detected in tier 1 processing 316) by comparing each fault to an associated fault threshold delineated in a PDP stored within memory 330 for the identified PII. A first rating is generated for each detected fault (contained in each PSDB) based on a context-based classification (CBC) type as documented in the PDP, the CBC being affiliated with the fault classification and PII identification that was contained in the PSDB. The first rating is used to determine PS and enterprise specific notification(s) of a fault condition for a particular PII infrastructure item.

In addition to generating a first rating, PE 322 generates a second rating that represents a compilation of all defects (faults) for a PII, each defect having a first rating, whereby the first-ratings are algorithmically combined to produce a second rating, the second rating being used to determine tandem messaging types for both PS and enterprise.

The predetermined diagnostic profile (PDP) enables the generation of the first and second rating, as it contains the CBC for a detected fault, as well as the fault thresholds for enterprise and fault threshold for public safety (method at 212). Hence, the first-tier processing identifies the PII and detects individual (distinct) fault conditions, and the second-tier processing generates first and second ratings based on pre-stored enterprise and PS fault thresholds. The recurrence of the same fault for a single PII over a predetermined time period may all be considered as part of the first rating. The second rating algorithmically weights the first rating and generates a cumulative weighted summation. The first and second ratings are compared to PS thresholds and enterprise thresholds. A few examples of first rating follow:

For example, the duration time between transponder transmissions for a ship PII may indicate the transponder being off, and/or not properly functional. The periodicity of the transponder transmissions might not exceed a PS transponder timing threshold but may exceed an enterprise transponder periodicity timing threshold. The first rating for a transponder signal periodicity being too infrequent might be rated low as it relates to a threat to the public; however, the enterprise rating for infrequent or absent transponder signaling may be rated high so as to indicate the need to timely maintenance of the PII (e.g.: ship communications in general).

For another example, a ship's running lights, or some portion thereof, that by law must be continuously illumined during night-time transits of navigable waterways, may be extinguished either continuously or intermittently (i.e.: intermittent turn on-off-on) as monitored by video sensors, the duration of the ship running lights be extinguished exceeding a PS threshold for maritime running lights being off, thereby indicating a clear and present danger to watercraft operation general proximity to the ship; however, the enterprise running light time threshold may not exceed an enterprise illumination timing threshold (i.e.: no law enforcement requirement for enterprise). For this instance, the PS first rating for the ships running lights being off would be high (indicating an actionable notification requirement), while the enterprise first rating for the running lights being off would be low (indicating a none notification requirement).

As another example, ship going outside of a geofence associated with a navigable channel in a commercial waterway, or even violating geofenced "keep out" regions proximate to nearby bridge infrastructure might exceed a PS geofence threshold and also exceed an enterprise threshold. The first rating for geofence fault would be high, and the enterprise rating for the geofence fault would also be high indicating the need for appropriate messaging of both PS and enterprise.

The prioritization engine 322 determines the second rating based on a weighted cumulative result for all detected faults of a singular PII accumulated over a predetermined time period, as shown at 332 (method 200 at 214). Each page <item_1> thru <item_n> in 332 is a defect record for each singular PII, where <item_1> sheet records PII #1 defects listing and associated first rating(s) for a given time period, continuing to <item_n> sheet records PII #n defects listing and associated first rating(s). If there is only a single defect and associated first rating generated for the same singular PII for a predetermined period of time, then the first rating may also assigned to the second rating, and the joint communication to PS and enterprise is determined based on the second rating. However, if there are multiple defects and associated first ratings for a singular PII, for example <item_1> in 332 for a given time period, then the second rating is derived from an algorithmic combination of the first ratings. The particular algorithmic may assume any known or mathematical means preferred by the user. For example, prioritization engine 322 may retrieve a plurality of first ratings for multiple faults for the same PII <item_1> in 332, where <item_1> is identified as a ship and the itemized first ratings may be as follows:

$1^{st}$ rating(n=0)=2; AIS transponder transmission not present $1^{st}$ rating(n=1)=4; running lights not on $1^{st}$ rating(n=2)=6; visual violation of geofence boundary for navigable channel in waterway Where for this application $1^{st}$ ratings range from 1 to 10, with a rating of 1 indicating minimal requirement for notification, and 10 being maximal requirement for notification.

Given the above first ratings for the same PII <item_1> in 332, then the second rating may be generated by applying the following formula at 322:

Where weighting factor a'(n)=1.5*$2^n$ where n is the number of faults for a particular PII.

$$2^{nd} \text{ rating} = \text{sum of } \{a'(k) * 1^{st} \text{ rating}(k) + a'(k-1) * 1^{st} \text{ rating}(k-1)\}$$

$$\text{Then } 2^{nd} \text{ rating for <item\_1>} = 1.5*2 + 3*4 + 6*6 = 51$$

In the preceding example, it is seen that as the number of defects increases for the same PII, the $2^{nd}$ rating increases at a multiplicative rate thereby accentuating the criticality of both PS and enterprise notifications. This same weighted algorithmic combination is applicable even if there is only a single type of fault detected, but the fault occurs multiple times for the same PII.

For example, assuming there are three instances of fire being detected for the same building designated as PII <item_n> in record 332, with each fire instance being assigned a first rating of 4. For this example, the weighting factor a' will still increase at a rate equal to a'(n)=1.5*$2^n$. Accordingly, if the fault is fire (e.g. having a first rating of 4) occurs once, then n=0, which generates weighting a'=1.5×$2^0$=1.5; then the first instance of fire used in calculating a second rating is 1.5*4, or 6. For the second occurrence of the same fault (e.g. fire) at a different location at the same infrastructure item, then the n goes to 1 which generates 1.5*$2^1$=3, and the second instance of fire that is used in calculating a second rating is 3*4, or 12. For a third instance of fire in the same building, then n=2 and a'=6, making the third instance of fire produce a second rating increase of 6*4 or 24. The second rating=the sum of the weighted first ratings (a summation loop) until all occurrences for the fault have been counted. (e.g. all occurrences of fire in the building). The second rating for this example is thus:

$$1.5*4 + 3*4 + 6*4 = 42$$

Comparing the previous two examples, it is apparent that there may be significant variations in the second rating values, depending on the nature of the fault(s) detected and the frequency of the fault occurrence for the same PII. Accordingly, the prioritization engine 322 may, in some cases, also apply variance modeling 336 over wide a distribution of second ratings so as to make adjustments in the weighting factor a'(n) generation, or first rating value(s) generation for a detected fault, and/or both. The purpose of refining the second rating value is to range said value as appropriate for determining both PS and enterprise notification pertaining to the PII.

The prioritization engine 322 compares the second rating to a predetermined cumulative threshold (method 200 at 216) at threshold detection block 334. The second cumulative threshold is stored in the predetermined diagnostic profile (PDP) for the identified PII in memory 330.

An enterprise notification is generated, by the prioritization engine 322, in response to the first rating exceeding an enterprise threshold, the notification including parsed sensor data for the enterprise fault along with an enterprise user selectable option to view the raw enterprise data associated with the enterprise fault (method 200 at 218).

A PS notification is generated, by the prioritization engine 322, in response to the first rating exceeding a PS threshold, the notification including parsed sensor data for the PS fault along with a PS user selectable option to view the raw PS data associated with the PS fault (method 200 at 220).

Both the PS and enterprise notifications are generated by alert message bundler 338 of PE 322. Alert notification bundler 338 "bundles" the notification header with a fault descriptor and the appropriate parsed sensor that is subsequently communicated to PS and/or to enterprise. The alert bundler 338 communicates the complied notification bundles to processor 320 for appropriate communication over network 314. The notification of PS and enterprise may be accomplished through various known wireless networks for transmission to enterprise radio 326 and/or PS radio 328. In this way the alert message bundler 338 of the prioritization engine 322 controls the notifications.

A combined PS and enterprise notification is generated, by the prioritization engine 322, in response to the second rating exceeding a predetermined cumulative threshold, the combined notification including selectable retrieval of parsed sensor data for each of the enterprise and PS faults (method at 222).

A further user selectable option is generated, by the prioritization engine 322, to view the raw sensor data associated with each identified PS and enterprise fault (method at 224).

The prioritization engine 322 may bundle alerts at 338 to further include estimated risk factors within a notification. The risk factor may be based on the different types of detected fault violations. So, for example a ship's transponder being off may be rated lower risk then a ship geofence violation.

The notifications are transmitted over the communications network to the designated enterprise portable radios 326 and/or PS portable radios 328. The notifications include a header identifying that whether the notification is a PS notification, enterprise notifications or a combined PS and enterprise notification.

Figure 4B:
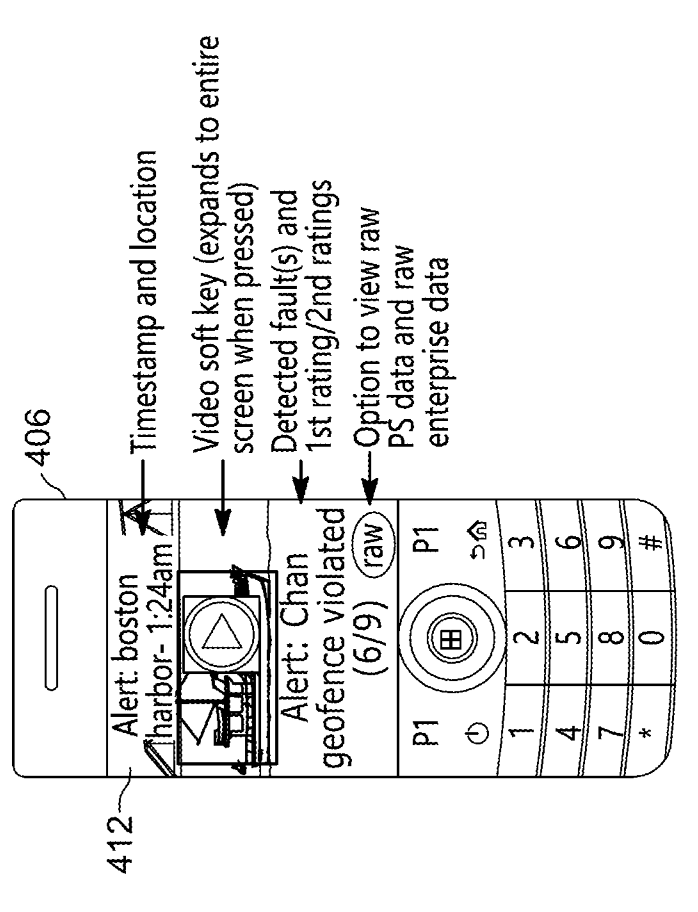

FIGS. 4A, 4B illustrate portable radios 400 operating in accordance with some embodiments, including a public safety (PS) portable radio 402, an enterprise portable radio 404, and a portable radio 406 which may be either a PS radio or an enterprise radio. Each radio 402, 404, 406 respectively includes a user interface display 408, 410, 412. Each portable radio further includes at least one radio electronic processor operatively coupled to its respective user interface display. Each radio electronic processor is further operatively coupled to a respective RF transceiver, and memory (along with other radio circuitry not shown). Each of the portable radios 400 wirelessly communicates with the communication system 100 of FIG. 1 (shown as portable radio 126 in FIG. 1) over a communication network. For example, the RF transceiver incorporated into each of enterprise radio 326 and PS radio 328 may include an LMR transceiver, a broadband transceiver, an IP packet data network and/or the like.

In accordance with some embodiments, the notifications generated as described by the previous embodiments, are displayed on the associated radio. In this example, the PS notification at PS radio 402 identifies an infrastructure type (e.g. a ship), that is traversing a navigable waterway proximate to the location of a second infrastructure (e.g. Francis Scott Key Harbor bridge), and notifies PS user indicating detected faults affiliated with the ship and associated rating (s) (first rating for each fault occurrences) which violated associated PS threshold(s). For example, the PS notification at PS radio 402 may indicate a high risk based on a few parameters that violated respective PS thresholds. The PS notification at PS radio 402 may further include an alert indicating that the ship visually violates a geofence fault threshold with a rating of 6, and an alert indicating that the ship's running lights are off exhibiting a fault threshold with risk rating of 4, and a third alert indicating violation of a transponder fault threshold with rating of 2. The notification further includes accessible parsed sensor data to view the PS anomalies which violated their respective fault thresholds. For example, a ten second video snippet with time stamp may be retrieved via a user selectable option on the display 408, the snippet including markers identifying the violations. A further user selectable option allows the PS user to expand the video to view the entire video as captured in the raw sensor data that first triggered the fault detection notification. This raw data option allows the PS user to select the raw data for each fault detected. For example, the geofence violation may be selected to view the geofence raw data throughout the video, with distances to a fixed bridge structure (also in the video). Accordingly, an example PS notification may display an icon that when selected, plays the parsed video section showing the ship with running lights off. The parsed video may have appropriate time stamp indicating the time when the video was captured. Below the video link individual fault notification(s) may be delineated, along with the associated first rating. This may be represented as follows:

Alert: AIS signal not detected (2)

Alert: running lights off (4)

Alert: channel geofence violation (6)

In addition to the fault delineation list, may appear general descriptors identifying the ship based on available information, and even identifying the known location of the bridge that is shown to be proximate to the ship.

Continuing to refer to FIG. 4A, for enterprise notification of the same incident, a notification at enterprise radio 404 may indicate a moderate risk based on the fault(s) first rating that violate respective enterprise first rating thresholds. The enterprise notification at enterprise radio 404 may be more limited than that of the messaging communicated to PS, given that the enterprise entity does not have law enforcement authority for operation of the ship. Accordingly, parsed video data may not be communicated to enterprise for radio 404, and notice of possible geofence violations also may not be communicated to enterprise radio 404. However, a time stamped alert message to radio 404 indicating that the ship's running lights are off, with a fault first rating of 4, and a second alert indicating violation of a transponder fault threshold with first rating of 2 may be communicated on user interface display 410 given the enterprise company receiving the message is responsible for ship maintenance. The enterprise notification further includes accessible parsed sensor data to view the enterprise rated faults exceeding their respective fault thresholds. For example, a transponder record of received beacon signaling with associated time stamps may be retrieved via a user selectable option on the display 410, the transponder record including markers identifying when a signal was last received (if any) with expected time widows wherein a beacon signal should have been received, but was not detected. Accordingly, an example enterprise notification may display an icon that when selected plays the transponder records showing the ship transponder is non-functional or off. The fault summary presented on enterprise radio 404 display 410 may be represented as follows:

Alert: AIS signal not detected (2)

Alert: running lights off (4)

FIG. 4B illustrates a combined PS and enterprise notification at portable radio 406 for operation in both PS and enterprise applications. The tandem PS and enterprise notification communicated to radio 406 is generated based on the second rating of each detected fault, the second rating exceeding the PS and enterprise thresholds for the identified particular PII. Because both PS and enterprise users of radio 406 will have access to both PS and enterprise fault parsed sensor data, the notification on display 412 may list only fault condition with highest second rating value. For example, user interface display 412 may include an alert indicating that the ship visually violates a geofence having a first rating of 6, and a second rating of 9 for a single fault detected (i.e.: 1.5*6). Other non-prioritized fault conditions would be accessible to the radio user "option menu" in the soft-key display icons. The notification further includes accessible parsed sensor data to view the relevant video, including for example, a ten second video snippet with time stamp may be retrieved via a user selectable option on the display 412. As in the case for the PS-only notification described for FIG. 4A, the snippet may include markers identifying the violations of the geofence and provide PS and enterprise viewers of the video clip with ancillary indicator of the ship proximity to an adjacent bridge. Accordingly, an example PS and enterprise notification may display an icon that when selected plays the parsed video section showing the ship proximity to the bridge. The parsed video may have appropriate time stamp indicating the time when the video was captured. Individual fault notification(s) may be delineated, along with the associated first rating and second rating. This may be represented as follows:

Alert: channel (chan) geofence violated (6/9)

FIG. 4B may also be summarized for the combined PS & enterprise notification by: receiving the combined PS & enterprise notification at a user interface display of a portable radio, the user interface display displaying: a video snippet associated with the PII from the parsed sensor data, the video snippet identifying each PS fault and each enterprise fault along with an associated time stamp indicating when the fault was detected in the raw sensor data, and displaying the user selectable option to view the raw enterprise data and raw PS data associated with the identified enterprise fault and the identified PS fault respectively.

While all of the radios benefit from the different notifications, the enterprise radio particularly benefits from the combined PS and enterprise notification which provides controlled retrievable access to otherwise inaccessible PS data as well as the enterprise data.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot receive raw sensor data, identify particular infrastructures of interest within the raw sensor data, detect fault conditions associated with the infrastructure of interest, generate parsed sensor data bundles identifying the fault associated with the infrastructure of interest, determine ratings with which to coordinate notifications for transmission to PS radios and/or enterprise radios, the notifications providing retrievable access for PS radios and enterprise radios to at least one of PS data (parsed and/or raw), enterprise data (parsed and/or raw), and a combined notification which allows PS radios and enterprise radios to retrieve public safety data and enterprise data, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors (i.e.: uP(s)), digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:

an electronic processor operationally coupled to a prioritization engine to provide processor controlled prioritization analytics, the processor controlled prioritization analytics configured to:

receive a plurality of parsed sensor data bundles (PSDBs), each parsed sensor data bundle (PSDB) identifying a fault associated with each of a plurality of different sensor sources of a particular infrastructure of interest (PII);

generate a first rating for each of identified fault by comparing each identified fault to a predetermined diagnostic profile associated with the PII, the predetermined diagnostic profile including enterprise fault thresholds for the PII and public safety (PS) fault thresholds for the PII;

generate a second rating based on a weighted cumulative total of the first-ratings, the first-ratings being algorithmically combined to produce the second rating;

compare the second rating to a predetermined cumulative threshold stored in the predetermined diagnostic profile;

generate an enterprise-only notification in response to the first rating exceeding the enterprise fault threshold, the enterprise-only notification including parsed sensor data for each identified enterprise fault;

generate a PS-only notification in response to the first rating exceeding the PS threshold, the PS-only notification including parsed sensor data for PS fault; and generate a combined PS and enterprise notification in response to the second rating exceeding the predetermined cumulative threshold, the combined PS and enterprise notification including a user selectable option for retrieval of parsed sensor data for each of enterprise and PS faults, the combined PS and enterprise notification.

2. The server of claim 1, wherein the combined PS notification and enterprise notification is communicated to both a user interface of a PS portable radio and a user interface of an enterprise portable radio.

3. The server of claim 1, wherein the combined PS and enterprise notification is configured to prevent access to private information within the parsed PS sensor data and raw PS data while allowing access to non-private information within the parsed PS sensor data and raw PS data.

4. The server of claim 1, further providing:

for the enterprise-only notification, an enterprise user selectable option to view raw sensor data associated with the identified enterprise fault;

for the PS-only notification, a user selectable option to view raw sensor data associated with the identified PS fault; and for the combined PS and enterprise notification, further including a user selectable option to view raw sensor data associated with each identified PS and enterprise fault.

5. The server of claim 1, wherein the first rating is further determined by correlating each detected fault to a context-based classification (CBC) type stored in the predetermined diagnostic profile and associated with the PII.

6. An enterprise portable radio, comprising:

a controller having a processor configured to:

request, from a server, permission to access both sensor based enterprise fault data and sensor based public safety fault data associated with a particular infrastructure of interest (PII); and receive, from the server and in response to the request, a combined public safety (PS) and enterprise notification, the combined PS and enterprise notification providing access to both the sensor based enterprise fault data and the sensor based public safety fault data when a weighted cumulative total, determined by the server, of all detected enterprise faults and detected PS faults exceeds a predetermined cumulative total associated with the PII, the combined PS and enterprise notification providing user selectable retrieval of parsed sensor data for each identified enterprise fault and each identified PS fault.

7. The enterprise portable radio of claim 6, further providing a user selectable option to view raw sensor data associated with each identified PS fault and enterprise fault.

8. A communication system, comprising:

a server configured to:

receive a plurality of parsed sensor data bundles (PSDBs) each parsed sensor data bundle (PSDB) identifying a detected fault condition of a particular infrastructure of interest (PII); and generate a first rating for each detected fault condition based on predetermined enterprise fault thresholds and predetermined public safety (PS) fault thresholds associated with the PII;

determine a second rating based on a weighted cumulative total of all the detected fault conditions which exceed the predetermined enterprise fault thresholds and predetermined PS fault thresholds;

a portable radio in communication with the server, the portable radio receiving one notification, from a plurality of notifications, comprising:

an enterprise-only notification in response to the first rating exceeding the predetermined enterprise fault threshold, the enterprise-only notification comprising parsed sensor data for the detected enterprise fault, along with an enterprise user selectable option to view raw enterprise data associated with the detected enterprise fault;

a PS-only notification in response to the first rating exceeding the predetermined PS threshold, the PS notification including parsed sensor data for the detected PS fault, along with a user selectable option to view raw PS data associated with the detected PS fault; and a combined PS & enterprise notification in response to the second rating exceeding a predetermined cumulative threshold, the combined PS and enterprise notification comprising user selectable retrieval of the parsed sensor data for each detected enterprise and PS faults.

9. The communication system of claim 8, wherein the the combined PS & enterprise notification, further comprises:

a user selectable option to view raw sensor data associated with each identified PS fault and enterprise fault.

10. A communication system, comprising:

one or more sensors coupled to one or more infrastructure items;

a computing device having a processor and a fault detection and bundling analytics engine providing first-tier processing, the processor configured to:

receive real-time raw sensor data inputs from the one or more sensors, the real-time raw sensor data containing information on at least one of the one or more infrastructure items;

identify a particular infrastructure item (PII) from the real-time raw sensor data;

detect one or more fault conditions for the PII;

generate, via the analytics engine, a parsed sensor data bundle (PSDB) to identify each fault condition associated with the PII;

communicate the PSDB bundle to a prioritization engine (PE);

a second computing device having a second processor and a prioritization engine providing second-tier processing, the second processor and prioritization engine configured to:

receive the PSDB;

generate a first rating for each detected fault condition by comparing each fault to a diagnostic profile, the diagnostic profile including fault thresholds for enterprise and fault thresholds for public safety;

determine a second rating based on a weighted cumulative total for all detected enterprise faults and all detected PS faults for the PII;

compare the second rating to a predetermined cumulative threshold; and generate an enterprise-only notification in response to the first rating exceeding the enterprise fault threshold, the enterprise-only notification including parsed sensor data for the detected enterprise fault along with enterprise user selectable option to view raw enterprise data associated with the enterprise fault;

generate a PS-only notification in response to the first rating exceeding PS threshold the PS-only notification including parsed sensor data for PS fault along with a user selectable option to view raw PS data associated with PS fault; and generate a combined PS & enterprise notification in response to a weighted cumulative total of all detected faults reported in the received PSDB(s) which exceed the PS and enterprise thresholds for the identified particular PII, the combined PS and enterprise notification including selectable retrieval of parsed sensor data for each identified enterprise fault and each identified PS fault along with a user selectable option to view raw sensor data associated with each identified PS and enterprise fault.

11. The communication system of claim 10, wherein the one or more fault conditions for the PII are predetermined fault conditions stored in a first memory associated with the first computing device.

12. The communication system of claim 10, wherein the fault conditions comprise PS fault conditions and enterprise fault conditions stored within a first memory associated with the first computing device.

13. The communication system of claim 12, wherein the diagnostic profile is stored in a second memory associated with the second computing device.

14. The communication system of claim 12, wherein the PS fault thresholds and enterprise fault thresholds are based on at least one of:

operational parameters associated with the PII; and operational states associated with the PIIs.

15. The communication system of claim 10, wherein the PS fault thresholds and the enterprise fault thresholds are different.

16. The communication system of claim 10, wherein the enterprise notification is communicated to a user interface display of an enterprise portable radio.

17. The communication system of claim 10, wherein the PS notification is communicated to a user interface display of a PS portable radio.

18. The communication system of claim 10, wherein the combined PS and enterprise notification is communicated to both a user interface of a PS portable radio and a user interface of an enterprise portable radio.

19. The communication system of claim 10, wherein the combined PS and enterprise notification is configured to prevent access to private information within the parsed PS sensor data and raw PS data while allowing access to non-private information within the parsed PS sensor data and raw PS data.

20. A method, comprising:

receiving, at a computing device, at least one of a plurality of real-time raw sensor data inputs from at least one sensor source of a plurality of sensor sources, the real-time raw sensor data containing information on at least one or more infrastructure items;

identifying a particular infrastructure item (PII) from the real-time raw sensor data;

detecting one or more fault conditions for the PII;

generating a parsed sensor data bundle (PSDB) identifying each fault condition associated with the PII;

communicating the PSDB bundle to a prioritization engine (PE);

generating a first rating for each detected fault by comparing each detected fault to an associated diagnostic profile, the diagnostic profile including fault thresholds for enterprise and fault thresholds for public safety (PS);

determining a second rating based on a weighted cumulative total of all detected faults of enterprise and PS for the PII;

comparing the second rating to a predetermined cumulative threshold stored in the diagnostic profile;

generating an enterprise-only notification in response to the first rating exceeding the enterprise fault threshold, the notification including parsed sensor data for the detected enterprise fault along with enterprise user selectable option to view the real-time raw sensor data associated with the enterprise fault;

generating a PS-only notification in response to the first rating exceeding PS threshold, the notification including parsed sensor data for the detected PS fault along with a user selectable option to view the real-time raw sensor data associated with the identified PS fault;

generating a combined PS and enterprise notification in response to the second rating exceeding predetermined cumulative threshold, the combined notification including user selectable retrieval of the parsed sensor data for each of enterprise and PS faults; and generating a further user selectable option to view the real-time raw sensor data associated with each identified PS fault and enterprise fault.

21. The method of claim 20, wherein detecting one or more fault conditions for the PII further comprises:

detecting the one or more fault conditions based on predetermined fault conditions for the PII stored in a memory associated with the first computing device.

22. The method of claim 20, further comprising:

communicating the enterprise notification to a user interface display of an enterprise portable radio.

23. The method of claim 20, further comprising:

communicating the combined PS and enterprise notification to a user interface display of an enterprise portable radio.

24. The method of claim 20, further comprising:

communicating the combined PS and enterprise notification to both a user interface display of a PS portable radio and a user interface display of an enterprise portable radio.

25. The method of claim 20, wherein the combined notification is configured to prevent access to predetermined private information within the parsed PS sensor data and raw PS data while providing access to non-private information within the parsed PS sensor data and raw PS data.

26. The method of claim 20, wherein the combined PS and enterprise notification further provides a user interface for:

displaying a video snippet associated with the PII, the video snippet being generated from the parsed sensor data, the video snippet identifying each PS fault and each enterprise fault in conjunction with a time stamp;

displaying the user selectable option as an icon to view the raw sensor data associated with the identified enterprise fault and the raw sensor data associated with the identified PS fault; and displaying the first and second rating associated with each identified PS fault and each identified enterprise fault.

* * * * *